(12) United States Patent
Spiekermann

(10) Patent No.: US 8,948,220 B2
(45) Date of Patent: Feb. 3, 2015

(54) WAVELENGTH-STABILIZED MICROCRYSTAL LASER

(71) Applicant: Coherent GmbH, Göttingen (DE)

(72) Inventor: Stefan Spiekermann, Hannover (DE)

(73) Assignee: Coherent GmbH, Göttingen (DE)

( * ) Notice: Subject to any disclaimer, the term of this patent is extended or adjusted under 35 U.S.C. 154(b) by 101 days.

(21) Appl. No.: 13/718,795

(22) Filed: Dec. 18, 2012

(65) Prior Publication Data

US 2014/0169390 A1 Jun. 19, 2014

(51) Int. Cl.
*H01S 3/113* (2006.01)
*H01S 3/10* (2006.01)
*H01S 3/06* (2006.01)
(Continued)

(52) U.S. Cl.
CPC ............... *H01S 3/10* (2013.01); *H01S 3/0627* (2013.01); *H01S 3/139* (2013.01); *H01S 3/025* (2013.01); *H01S 3/0401* (2013.01); *H01S 3/042* (2013.01); *H01S 3/105* (2013.01); *H01S 3/113* (2013.01); *H01S 3/1611* (2013.01); *H01S 3/0405* (2013.01); *H01S 3/0604* (2013.01); *H01S 3/0612* (2013.01); *H01S 3/1643* (2013.01)
USPC .................... 372/11; 372/10; 372/34; 372/36; 372/75; 372/92; 372/98; 372/99; 372/107

(58) Field of Classification Search
CPC ..... H01S 3/0405; H01S 3/0627; H01S 3/113; H01S 3/042; H01S 3/025; H01S 3/1611; H01S 3/1115; H01S 3/1643; H01S 3/1118; H01S 3/1673

USPC .......... 372/10, 11, 34, 107, 36, 99, 75, 92, 98
See application file for complete search history.

(56) References Cited

U.S. PATENT DOCUMENTS 5,394,413 A 2/1995 Zayhowski
5,489,778 A 2/1996 Burmester et al.
(Continued)

FOREIGN PATENT DOCUMENTS

DE 4306919 A1 9/1994
JP 2004-311719 A 11/2004
JP 2007-214207 A 8/2007

OTHER PUBLICATIONS

International Search Report and Written Opinion received for PCT Patent Application No. PCT/EP2013/076260, mailed on Mar. 25, 2014, 13 pages.

(Continued)

*Primary Examiner* — Colleen A Matthews
*Assistant Examiner* — Delamr R Forde
(74) *Attorney, Agent, or Firm* — Morrison & Foerster LLP

(57) ABSTRACT

A microcrystal laser assembly including a gain-crystal includes a frame having a high thermal conductivity. The frame has a base with two spaced apart portions extending from the base. The gain-crystal has a resonator output minor on one surface thereof. The gain-crystal is supported on the spaced-apart portions of the frame in the space therebetween. Another resonator minor is supported in that space, spaced apart from the output mirror, on a pedestal attached to the base of the frame. The pedestal and the frame have different CTE. Varying the frame temperature varies the spacing between the resonator minors depending on the CTE difference between the pedestal and the frame.

17 Claims, 4 Drawing Sheets

(51) Int. Cl.
*H01S 3/139* (2006.01)
*H01S 3/02* (2006.01)
*H01S 3/04* (2006.01)
*H01S 3/042* (2006.01)
*H01S 3/105* (2006.01)
*H01S 3/16* (2006.01)

(56) References Cited

U.S. PATENT DOCUMENTS

| | | | |
|---|---|---|---|
| 5,495,494 A | 2/1996 | Molva et al. | |
| 5,982,802 A | 11/1999 | Thony et al. | |
| 6,002,704 A | 12/1999 | Freitag et al. | |
| 6,101,201 A * | 8/2000 | Hargis et al. | 372/36 |
| 6,373,864 B1 | 4/2002 | Georges et al. | |
| 6,778,563 B2 | 8/2004 | Pasiskevicius et al. | |
| 7,649,920 B2 * | 1/2010 | Welford | 372/34 |
| 2005/0018723 A1 * | 1/2005 | Morita et al. | 372/29.02 |
| 2005/0078719 A1 * | 4/2005 | Masuda | 372/29.02 |
| 2005/0094689 A1 * | 5/2005 | Ludewigt | 372/36 |
| 2011/0243158 A1 * | 10/2011 | Spiekermann et al. | 372/11 |
| 2012/0257647 A1 * | 10/2012 | Shu et al. | 372/36 |

OTHER PUBLICATIONS

Notice of Allowance received for U.S. Appl. No. 13/074,274, mailed on Dec. 24, 2013, 10 pages.

Non Final Office Action received for U.S. Appl. No. 13/074,274, mailed on Apr. 3, 2013, 14 pages.

Zayhowski et al., "Diode-Pumped Microchip Lasers Electro-Optically Q Switched at High Pulse Repetition Rates", Optics Letters, vol. 17, No. 17, Sep. 1, 1992, pp. 1201-1203.

Non Final Office Action received for U.S. Appl. No. 13/074,274, mailed on Aug. 8, 2013, 10 pages.

* cited by examiner

WAVELENGTH-STABILIZED MICROCRYSTAL LASER

TECHNICAL FIELD OF THE INVENTION

The present invention relates in general to single-frequency (single-wavelength) microcrystal lasers. The invention relates in particular to stabilizing the single wavelength by temperature control of the lasers.

DISCUSSION OF BACKGROUND ART

A microcrystal laser (micro-laser) is a laser having a solid-state gain-element in the form of a very thin crystal of a gain-medium, for example, neodymium-doped yttrium aluminum garnet (Nd:YAG) or neodymium-doped yttrium orthovandate (Nd:YVO$_4$). A microcrystal laser can be of a monolithic form, in which a laser resonator (resonant cavity) is formed by applying reflective coatings (resonator minors) to opposite faces of the crystal. Here, the optical length of the resonator is determined by the thickness and the refractive index, of the crystal, and the temperature of the crystal.

A microcrystal laser can also have a so-called semi-monolithic form in which one resonator mirror is coated on one face of the crystal and the other resonator mirror is spaced apart from the crystal. This semi-monolithic form has an advantage over the monolithic form in that the resonator length can be selected independent of the thickness and material of the crystal. This semi-monolithic form also allows inclusion in the resonator of an active or passive Q-switch for providing pulsed operation of the laser.

Any laser-resonator has a number of resonant frequencies (wavelengths) determined by the optical length of the resonator. Any of these resonant wavelengths that fit within a gain-bandwidth of the gain-element can be lasing wavelengths (modes) of the laser resonator. The above referenced Nd:YAG and Nd:YVO$_4$ gain media have a gain bandwidth of the order of about 1 nanometer (nm). In a "conventional" laser-resonator wherein the resonator length is a few centimeters or more, many modes will fit even within this 1 nm-bandwidth. Various relatively complex resonator arrangements are known for selecting one lasing mode from those possible lasing modes.

As the optical path length of a laser-resonator is reduced, the possible number of resonant wavelengths is reduced, and the wavelength-separation (free spectral range or FSR) of those resonant wavelengths within the gain-bandwidth of the gain-element is increased. In a micro-laser the resonator optical length is decreased until there are few enough resonant wavelengths within the gain-bandwidth of the gain-element (gain-crystal) that only one wavelength will be above a threshold gain-level, and, accordingly only that wavelength will "lase" (oscillate). The lasing efficiency, and accordingly the laser output power, will be determined, inter alia, by the wavelength of that lasing mode relative to the peak-gain wavelength in the gain-bandwidth. This lasing mode wavelength is dependent on the temperature of the micro-laser. It is taught that control of the temperature can provide for tuning of stability of the output wavelength of a micro-laser.

U.S. Pre-grant Publication No. 2011/0243158, assigned to the assignee of the present invention, and the complete disclosure of which is hereby incorporated by reference, describes a semi-monolithic micro-laser including a saturable semiconductor minor (SESAM). The SESAM is used as a resonator mirror and provides for passive Q-switched operation of the micro-laser.

FIG. 1 schematically depicts one practical disclosed structure 2 of the '158 micro-laser. The laser is assembled on a base 17. A thin gain-crystal 4 has a partially reflective and partially transmissive mirror 6 on one face thereof. The coated crystal is supported mirror-side-down on a transparent support 10. An anti-reflection coating 13 is provided on the opposite face of the crystal. A SESAM 8 is supported on base 17. The SESAM is spaced apart from the gain-crystal by spacers 16 and 16' leaving an air gap 12 between the SESAM and the gain-crystal. A laser-resonator is formed between the SESAM and mirror 6. The optical length of the resonator provided by the optical thickness of the gain crystal and the thickness of the air is fine-tuned by thermal expansion or contraction of spacers 16 and 16'. While not disputing the practicality of the prior-art structure of FIG. 1, it has been determined that there is significant room for improvement, particularly with regard to providing tuning and temperature stability of the lasing wavelength.

SUMMARY OF THE INVENTION

In one aspect laser apparatus in accordance with the present invention comprises a frame having a base-portion and two spaced-apart support-portions extending from the base-portion. The support-portions are of a first thermally conductive material having a first coefficient of thermal expansion (CTE). A pedestal is attached to the base-portion in thermal communication therewith and in the space between the support-portions. The pedestal is of a second thermally conductive material having a second CTE different from the first CTE. A saturable absorption minor supported on the pedestal. A thin crystal of a solid-state gain-medium is attached to a crystal-support element in the space between the support-portions of the frame, and is spaced apart from the saturable absorption minor leaving an air-gap between the crystal and the saturable absorption mirror. The crystal-support element is attached to the support-portions of the frame. A partially transmissive minor is located between the crystal and the crystal-support element. The partially transmissive mirror and the saturable absorption minor form a laser-resonator including the crystal, and the laser-resonator has an optical length determined by the thickness of the crystal and the air-gap. Varying the temperature of the frame and the pedestal varies the air-gap, and accordingly the optical length of the laser-resonator, dependent on the difference between the first CTE and the second CTE.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 1:
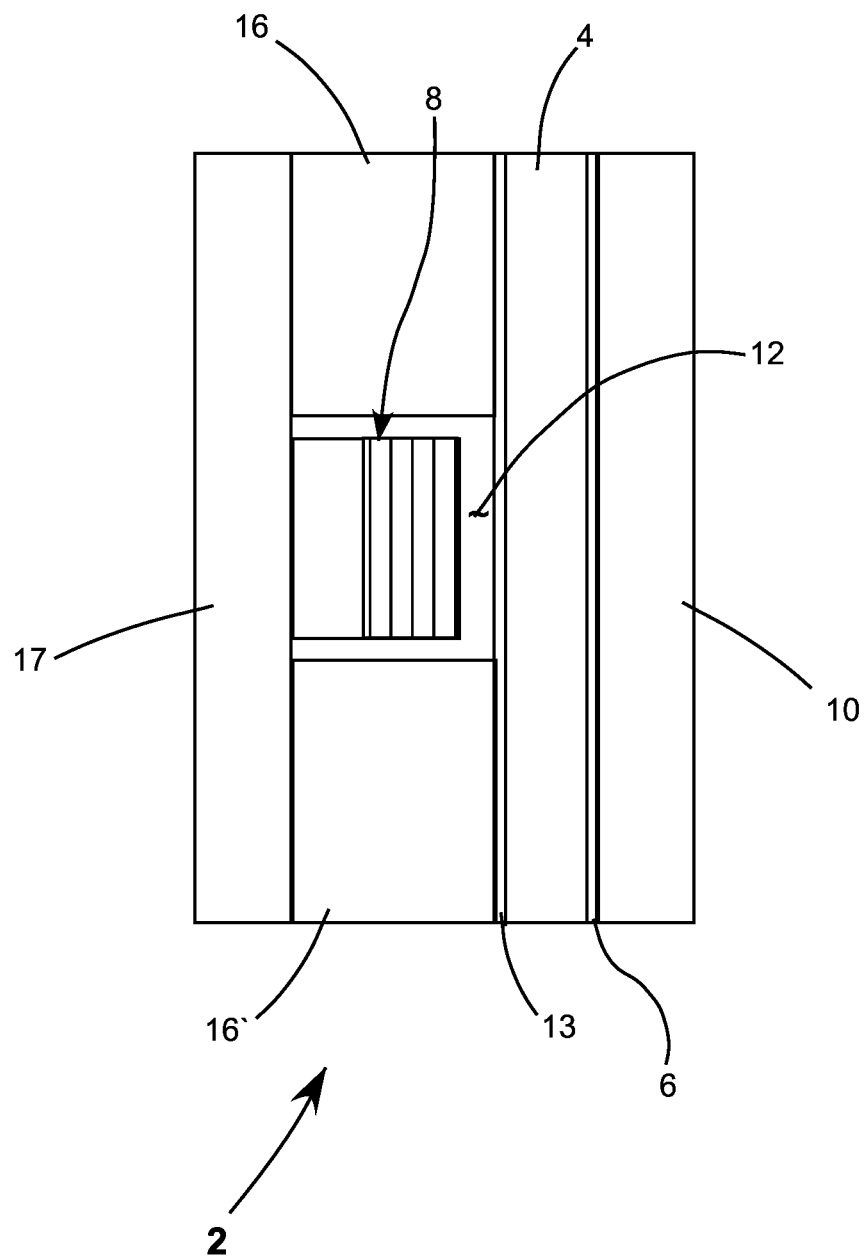
FIG. 1 is a side-elevation view schematically illustrating an above-referenced prior-art structural arrangement for a passively Q-switched microcrystal laser.
Figure 2:
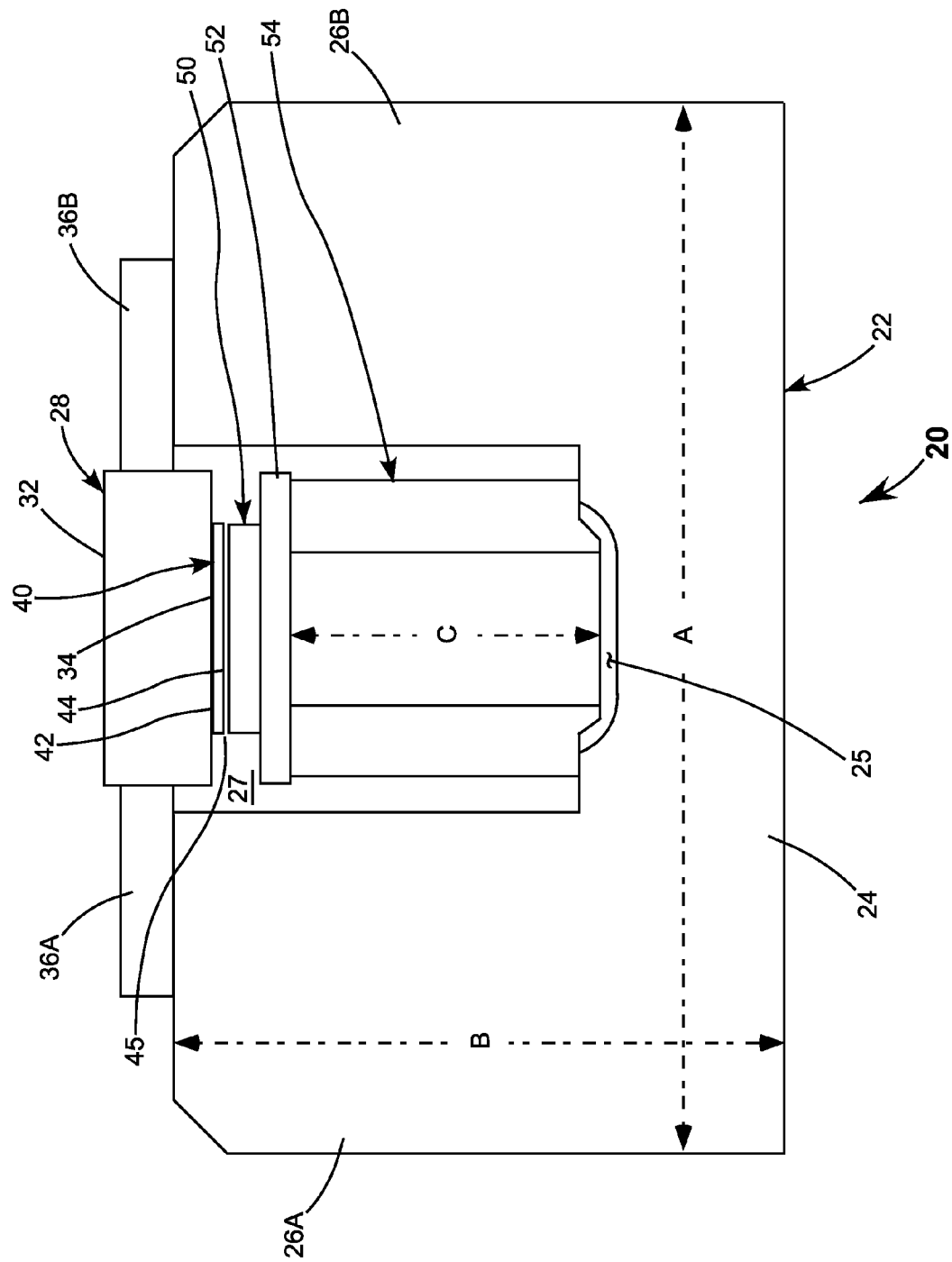
FIG. 2 is a side elevation view schematically illustrating a preferred embodiment of a passively Q-switched microcrystal laser in accordance with the present invention.

Referring now to the drawings, wherein like components are designated by like reference numerals, FIG. 2 schematically illustrates a preferred embodiment of a solid-state microcrystal laser 20 in accordance with the present invention. Components of the laser assembly are depicted relatively approximately to scale, but expanded in actual size. Exemplary dimensions are provided further hereinbelow. Additional perspective of the assembly is provided in FIG. 3.

Laser 20 includes a generally U-shaped unitary frame 22 which is massive compared to the actual laser components. Frame 22 includes a base portion 24 and upwardly extending side portions 26A and 26B. Frame 22 is made from a material having a high-thermal conductivity, for example, copper (Cu) or an alloy thereof such as an alloy of copper and tungsten (W). It is possible make the base-portion and the support-portions as separate units, but this may not be any more convenient than the unitary structure. In this description the terminology "high thermal conductivity" refers to a conductivity about equal to or greater than 5 Watts per meter per degree Kelvin (W/m·K).

The gain-element of laser 20 is a thin crystal 40, for example a crystal of a host material such as YAG or $YVO_4$ doped with laser-active Nd ions. A crystal-support element 28 is made from an optically transparent material, preferably also having a high thermal conductivity. A preferred material for support element 28 is the same as that of the crystal but without the laser-ion doping. YAG and $YVO_4$ have the required high thermal conductivity and also have a CTE comparable to copper-tungsten alloy. One alternative material is optical sapphire (aluminum oxide, $Al_2O_3$).

Crystal support element 28 is bonded to members 26A and 26B of frame 22 via tabs 36A and 36B respectively. These tabs are also preferably made from a material having a high thermal conductivity, and can be conveniently made from the same material as support member 28.

A partially transmitting (at the lasing wavelength) mirror-coating 42 is deposited on surface 34 of crystal-support element 28. The mirror-coating is not visible on the scale of the drawing but can be assumed to be synonymous with surface 34. An antireflection coating is applied to a surface of crystal 40 which is placed on the support member then attached to attached support element 28 by a band of adhesive (not shown) around the edge of the crystal. The mirror-coating on the support member provides an output-coupling end-mirror of laser 20. In this embodiment, the mirror-coating is made highly transmissive for optical pump radiation, which is directed into crystal 40 through support element 28 and the minor-coating. Surface 32 of the crystal-support element 28 is preferably antireflection coated for both the laser-radiation and pump-radiation wavelengths.

An alternative method of assembling thin crystal 40 to support-element 28 could be to begin with a block of laser-crystal material; apply the minor-coating to one surface of the block; optically contact the mirror-coated surface of the block to the support element; then grind and polish the block to a required thickness for the crystal. Those skilled in the optical fabrication art my devise other methods for forming the crystal and required coating on the support element without departing from the spirit and scope of the present invention.

A saturable absorption minor 50 is aligned parallel to the minor-coating on the support element and provides the other end of the laser-resonator of laser 20. The saturable absorbing mirror is for providing passive Q-switched operation of laser 20. In this preferred embodiment, mirror 50 is a SESAM including multiple layers of semiconductor materials in the gallium aluminum arsenide (GaAlAs) system epitaxially grown on a gallium arsenide (GaAs) substrate. The SESAM is supported, in channel 27 between frame portions 26A and 26B of frame 22, via an optional strain-compensating element 52, on a pedestal 54 attached to base-portion 24 of frame 22.

Here it should be noted that semiconductor saturable absorption minors are often referred to as saturable Bragg reflectors (SBRs).

Pedestal 54 preferably has a high thermal conductivity, but must be of material having a coefficient of thermal expansion (CTE) different from that of the material of frame 22. In this preferred embodiment, pedestal 54 is made from aluminum (Al) and the frame is made from a copper-tungsten alloy. A cut-out portion 25 of base portion 24 of frame 22 provides for adjusting alignment of the pedestal during attachment thereof to the frame.

The CTE of the aluminum pedestal is higher than that of the copper tungsten frame. A W80Cu20 copper-tungsten allow has a CTE of about $9*10^{-6}$. Aluminum has a CTE of about $24*10^{-6}$. Strain-compensating element 52 in this embodiment is formed from aluminum nitride, which has a relatively high thermal conductivity and a CTE which is comparable to the GaAs of the SESAM. The SESAM is attached to the strain compensating element, and the strain compensating element is attached to the pedestal by solder bonding. Providing the strain-compensating element reduces strain on the relatively fragile SESAM, which results from CTE differential as the solder-bond solidifies and cools.

The dimensions of components of the assembly of laser 20 are selected such that the optical length of the laser-resonator is less than about 1.0 millimeters (mm) to minimize the number resonant wavelengths within the gain-bandwidth of the gain-crystal. Here, the resonator optical length is provided by the thickness of crystal 40 multiplied by the refractive index of the crystal, and the thickness (distance) of an air-gap 45 between SESAM 50 and crystal 40.

It is useful to add a coating to the SESAM which allows transmission of the laser wavelength but reflects the pump radiation wavelength. This prevents absorption of pump radiation into the SESAM which could damage or impair the passive Q-switching performance of the SESAM. Alternatively such a coating could be provided on surface 44 of crystal 40.

In an example of the preferred embodiment here-described, crystal 40 is an Nd:YAG crystal having a thickness of 150 μm and a refractive index of about 1.8. Air-gap 44 is has a thickness (length) of about 50 μm. This provides that the laser resonator has a FSR of about 1.5 nm. This provides that only one resonant wavelength within the gain-bandwidth can have a gain above the threshold for lasing.

In this example of laser 20, dimension A of frame 22 is about 10 mm and dimension B is about 8 mm. The height C of pedestal 54 is about 3 mm. With all parts fixedly bonded, variations in the resonator length will occur primarily due to the CTE difference between the frame and the pedestal.

In this example, with frame 22 made from a W80Cu20 alloy with pedestal 54 made from aluminum, with CTE values noted above, the CTE difference will provide that air-gap 45 changes in thickness (distance) by about 0.5 μm for 10° C. change in temperature. At the nominal lasing wavelength of 1.064 μm (1064 nm) this 0.5 μm change is about one-half wavelength, so the temperature effectively scans (tunes) the resonator through one free-spectral range thereof. With the exemplary FRS of about 1.5 nm, this equates to a wavelength-sensitivity (temperature-tuning coefficient) of about 0.15 nm/° C.

Figure 3:
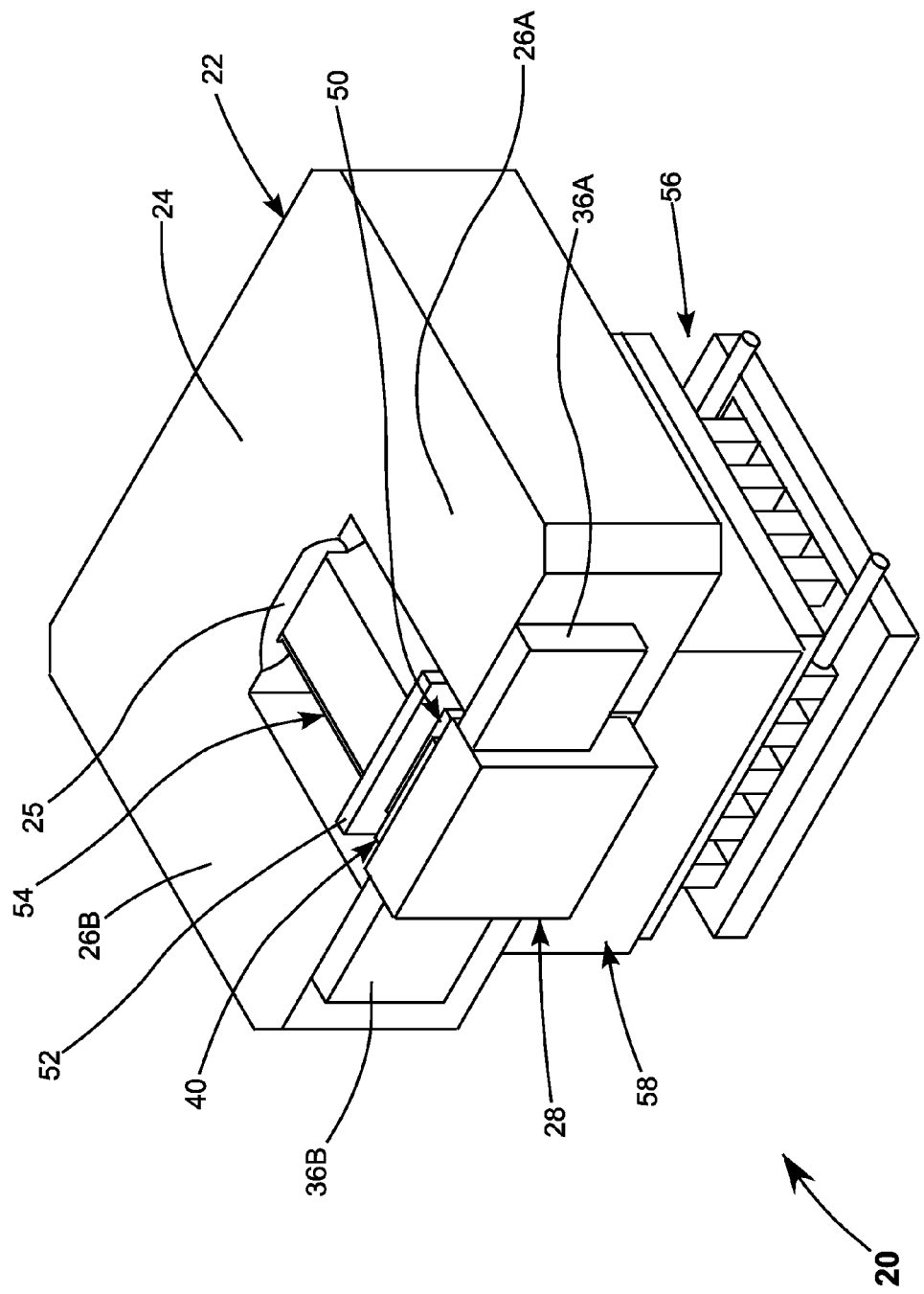
FIG. 3 is a three-dimensional view schematically illustrating further detail of the microcrystal laser of FIG. 2 including a heating or cooling element for adjusting and controlling the temperature of the laser.

As seen in FIG. 3, a Peltier element 56 can be provided for heating the assembly. Such an element can also be operated for cooling as is known in the art. Element 56 is in contact with a block 58 preferentially of the same material frame 22. Block 58 is in thermal contact with the base portion 24 and side portions 22A and 22B of frame 22. This provides for a relatively quick response of the frame and attached components to temperature changes provided by the heater. Such a Peltier element can provide relative thermal control within ±0.05° C. of a nominal temperature.

It is preferred to operate laser 20 at a temperature of less than about 30° C. for providing reliability and extending lifetime of the SESAM. If laser 20 were enclosed in sealed environment, it may be possible to reduce the temperature significantly below 30° C. without incurring problems due to condensation, thereby further extending the SESAM lifetime.

The selection of the differential CTE of the frame and pedestal components will result from a compromise between a differential CTE which is low enough to provide thermal stability, but high enough to allow an FSR-range of wavelength tuning within a relatively small temperature range around an anticipated operating ambient temperature. This tuning is necessary, as a lasing wavelength at or near the maximum gain cannot be guaranteed from the mechanical assembly alone.

The frame and support members being massive compared to the actual laser components, and having relatively much higher thermal mass, once temperature tuned to lasing wavelength it is possible that the laser could operate for relatively long periods with the heating element at a fixed temperature. It would be useful, however, to provide for a closed-loop control arrangement for stabilizing the wavelength. A brief description of one possible such arrangement is set forth below with reference to FIG. 4.

Figure 4:
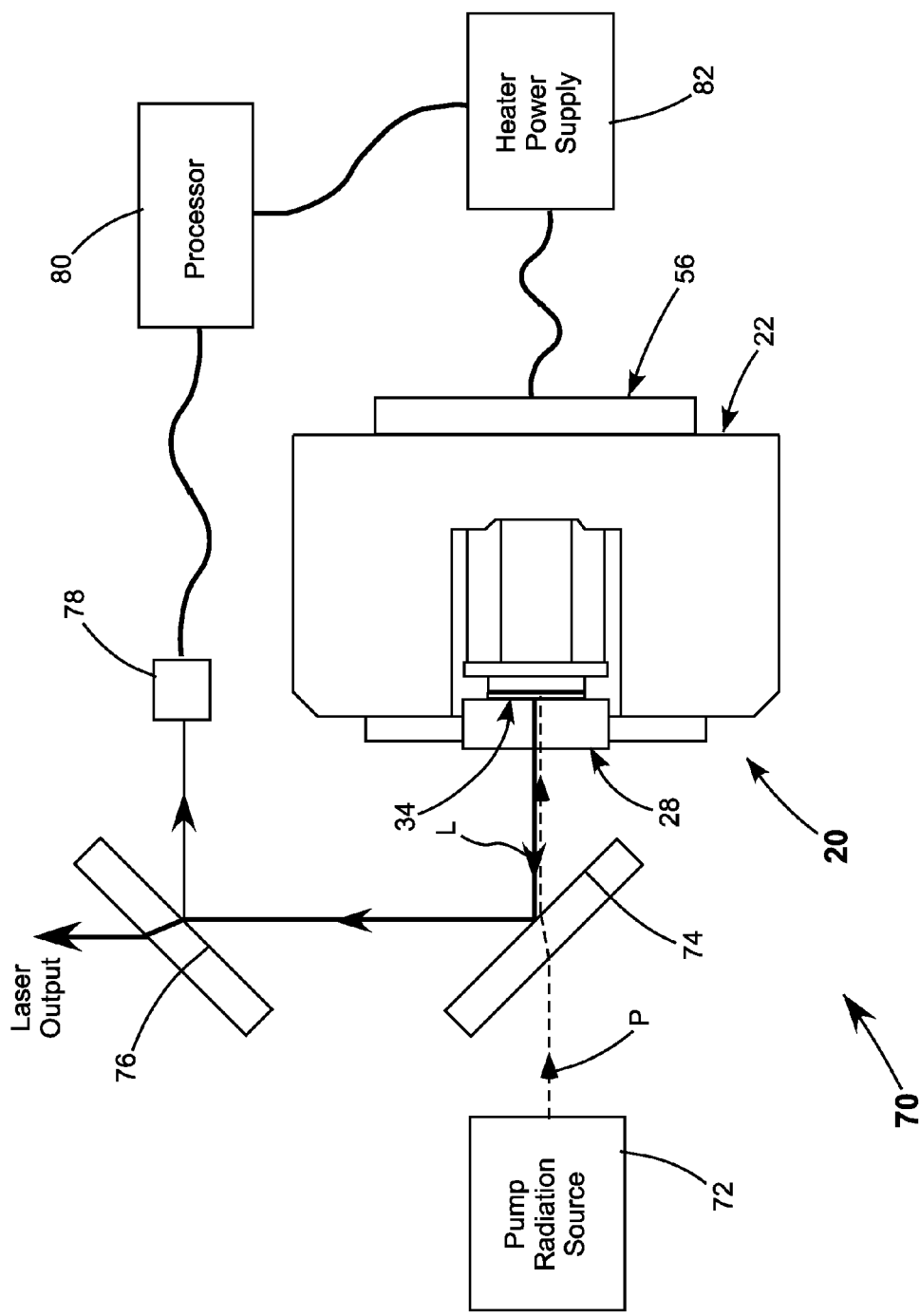
FIG. 4 schematically illustrates a closed-loop arrangement for controlling the operating wavelength of the microcrystal laser of FIG. 3 using the heating and cooling element.

FIG. 4 schematically illustrates a stabilized microcrystal laser arrangement 70 including a microcrystal laser assembly 20 similar to that described above with reference to FIGS. 2 and 3. In FIG. 4, Peltier element 56 is depicted as being attached to the base of frame 22 for convenience of illustration. The Peltier element is preferably arranged as discussed above with reference to FIG. 3.

A pump radiation source 72, such as a diode-laser, delivers pump-radiation P. The pump-radiation is transmitted through a dichroic mirror 74, then through crystal support element 28 to gain-crystal 40 of laser 20. Dichroic minor 74 is transparent for the wavelength of the pump-radiation and reflective for the wavelength radiation generated by laser 20. In response to the delivery of pump radiation, laser 20 delivers laser radiation L. This radiation is reflected by dichroic minor 74 to a beam-splitting minor 76. Mirror 76 reflects a small fraction of the laser radiation, for example about 1% thereof, and transmits the remainder as laser output.

The reflected laser radiation from mirror 76 is incident on a detector 78. A signal from detector 78 representative of the laser output power is transmitted to a microprocessor 80. The microprocessor is programed to increase or decrease electrical power supplied by a heater power supply 82 to element 56 (correspondingly increasing or decreasing the temperature of the laser assembly) until the detected laser output power is maximized. The absolute value of the maximized, stabilized, output power will be determined, inter alia, by the pump-radiation power delivered to the gain-crystal.

The present invention is described above in terms of a preferred and other embodiments. The invention is not limited, however, to the embodiments described and depicted. Rather, the invention is defined by the claims appended hereto.

What is claimed is:

1. Laser apparatus, comprising:
a frame having a channel formed therein and said frame being formed from a first thermally conductive material having a first coefficient of thermal expansion (CTE);
a pedestal fitted within the channel of the frame in thermal communication therewith, the pedestal being of a second thermally conductive material having a second CTE different from the first CTE;
a saturable absorption mirror supported on the pedestal;
a thin crystal of a solid-state gain-medium attached to a crystal-support element aligned with and spaced apart from the saturable absorption mirror leaving an air-gap between the crystal and the saturable absorption mirror, the crystal-support element being attached to the frame;
a partially transmissive mirror between the crystal and the crystal-support element, the partially transmissive mirror and the saturable absorption mirror forming a laser-resonator including the crystal, and the laser-resonator having an optical length determined by the thickness of the crystal and the thickness of the air-gap;
wherein varying the temperature of the frame and the pedestal varies the thickness of the air-gap, and accordingly the optical length of the laser-resonator, dependent on the difference between the first CTE and the second CTE; and
a thermal contact block of a thermally conductive material in thermal communication with the frame, and a Peltier element in thermal communication with the thermal contact block, for providing the varying of the temperature of the frame and the pedestal.

2. The apparatus of claim 1, wherein the crystal support element is attached to the the frame by first and second tabs attached to opposite sides of the support element.

3. The apparatus of claim 2, wherein the tabs are made from the same material as the frame.

4. The apparatus of claim 1 wherein gain-medium is a host material doped with laser-active ions, and the crystal-support element is made from the un-doped host material.

5. The apparatus of claim 4 wherein the host material is one of YAG and $YVO_4$ and the laser active ions are Nd ions.

6. The apparatus of claim 1, wherein the first material is an alloy of copper (Cu) and tungsten (W) and the second material is aluminum.

7. The apparatus of claim 6, wherein the alloy of copper and tungsten is a W80Cu20 alloy.

8. The apparatus of claim 1, wherein the saturable absorbing mirror is supported on the pedestal with a strain compensating element between the saturable absorbing mirror and the pedestal.

9. A laser apparatus comprising:
a base having a channel formed therein extending from a surface thereof partially into the base, said base having a high thermal conductivity;
a pedestal fitted with within the channel and supported by the closed end of the channel, with the coefficient of thermal expansion of the pedestal being greater than the thermal coefficient of thermal expansion of the base;
a saturable absorber supported by the pedestal and defining a first resonator minor;
a laser gain medium aligned with and spaced from the saturable absorber mirror by an air gap;
a support coupled to the gain medium and to the base; and a second resonator minor positioned between the support and the gain medium, wherein varying the temperature of the based and pedestal functions to vary the thickness of the air gap to thereby adjust the wavelength output of the laser.

10. An apparatus as recited in claim 9 further including a strain compensator layer positioned between the saturable absorber mirror and the pedestal.

11. An apparatus as recited in claim 9 wherein said support is formed from a transparent crystal through which pump light can be transmitted to the gain medium.

12. An apparatus as recited in claim 9 further including a heater element thermally coupled to the base.

13. An apparatus as recited in claim 12 further including a detector for monitoring the output of the laser and generating output signals in response thereto, said signals being supplied to a processor, said processor for controlling the heater element in order to stabilize the output of the laser.

14. A laser apparatus comprising:
   a pedestal;
   a saturable absorber material defining a first minor mounted on one end of the pedestal;
   a solid state gain medium spaced apart from the first minor to define an air gap, said gain medium having a partially transmitting coating thereon on the side opposite the first mirror, said coating defining the output coupler of the laser, with a laser resonator being defined between the first minor and the output coupler;
   a support element carrying the gain medium;
   a frame, said frame extending across the length of the pedestal and across the air gap between the first mirror and the gain medium, and wherein said support element is supported by and thermally coupled to the frame and wherein said pedestal is supported by and is thermally coupled to the frame, and wherein the coefficient of thermal expansion (CTE) of the material forming the frame is lower than the CTE of the material forming the pedestal; and
   a Peltier element thermally coupled to the frame for controlling the temperature of the apparatus and wherein a change in temperature varies the thickness of the air gap and accordingly the optical path length of the laser resonator.

15. An apparatus as recited in claim 14 wherein the pedestal is formed from aluminum.

16. An apparatus as recited in claim 14 wherein radiation from a pump radiation source is directed into the gain medium through the output coupler.

17. An apparatus as recited in claim 16 wherein the surface of the first minor facing the gain medium is provided with a coating to reflect pump beam radiation that has been transmitted through the gain medium.

* * * * *